Feb. 7, 1967 D. L. SCHMITT ETAL 3,302,446
DETECTING AN EXPENDABLE OIL PIPE LINE PLUG
Filed Feb. 17, 1964
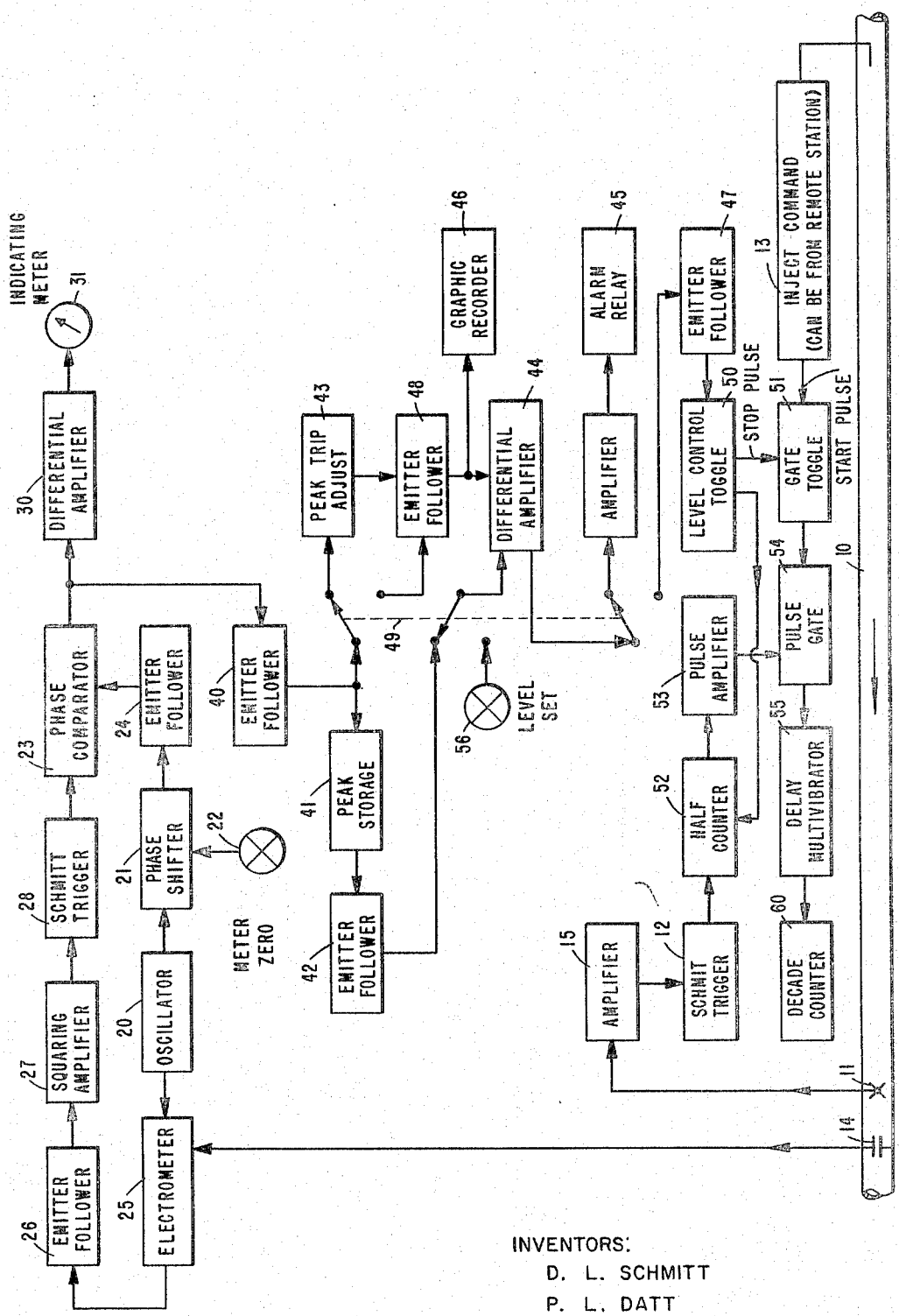
INVENTORS:
D. L. SCHMITT
P. L. DATT
BY Theodore E. Bieber
THEIR ATTORNEY

United States Patent Office 3,302,446
Patented Feb. 7, 1967

3,302,446
DETECTING AN EXPENDABLE OIL PIPE LINE PLUG
David L. Schmitt, Indianapolis, Ind., and Paul L. Datt, Walnut Creek, Calif., assignors to Shell Oil Company, New York, N.Y., a corporation of Delaware
Filed Feb. 17, 1964, Ser. No. 345,441
6 Claims. (Cl. 73—3)

This invention relates to apparatus for detecting an expendable plug in an oil pipe line and more particularly apparatus for detecting a specific point in a flowing oil pipe line stream, wherein there has been injected a small amount of a particular class of liquid additive, which is compatible with the flowing oil stream and which has such chemical and physical characteristics as to maintain unchanged its relative position in the flowing oil stream while enhancing the electrical conductivity properties of the part of the flowing oil stream into which it is injected.

In normal operations, oil pipe lines consecutively move through a single pipe or conduit contiguous batches of different crudes or products or batches of the same class of material or product for different shippers. To effect delivery of the separate batches at destination by diverting the stream to the proper product tank and/or to the proper shipper, it is desirable to mark the junction point of consecutive batches at the shipping point and to detect with suitable instrumentation such junction point accurately and reliably at destination or diversion point along the line and to generate an electrical signal to effect the proper diversion of the following batch. If such marking and detection can be achieved, numerous other problems in pipe line operations, hereinafter more fully described, can be resolved.

In the past, considerable effort has been expended in an attempt to develop a satisfactory means of determining a specific point in a flowing pipe line stream. Numerous methods of accomplishing this goal have been proposed and tested but no fully satisfactory or reliable method has evolved.

One such method of marking a point in a pipe line stream is to insert solid plugs, balls, or scrapers into the pipe line. The system of using such devices has drawbacks in requiring launching equipment for putting the plug into the pipe line, complex by-pass equipment at each pump station along its route of travel and receiving equipment to catch the plug at the terminus of the pipe line. Such systems require considerable attention and maintenance, and their first cost and maintenance cost are very high. In addition, as these plugs move through the pipe line, they are subject to wear at their points of contact with the pipe wall. Such wear ultimately permits the device to gradually stray from the point of injection in the stream, thus resulting in inaccurate determinations of such point of injection at down stream locations. Finally, these plugs, upon reaching their destination, must be physically transported from their final destination locations back to their original point of insertion into the pipe line. The physical handling of these plugs, scrapers or balls has proved to be an expensive and time-consuming procedure. Finally, due to the current industry trend toward larger pipe lines sizes, these plugs are becoming increasingly difficult to handle due to their weight and size.

It has also been proposed to utilize radioactive isotopes in a suitable, compatible suspension that are injected at one location and subsequently detected as they pass a specific point along the pipeline some distance down stream of the injection station. While this is a possible method of marking a point in a flowing pipe line stream, it involves danger to personnel handling the radioactive materials. In addition, many regulations of the various governmental agencies must be complied with when using such hazardous radioactive materials.

It has also been suggested that a suitable material such as alcohol be injected into the pipe line at the first location to effect a measurable change in dielectric constant of the pipe line liquid stream when it passes the second location. The use of dielectric materials and measuring devices of course requires considerable volumes of material that have particular characteristics often incompatible with petroleum products.

Finally, a suitable material can be injected to significantly change the electrical conductivity of the liquid stream. By use of a material such as described in co-pending application, Serial No. 326,405 filed November 27, 1963, by Elmer H. Rush, entitled "Expendable Pipeline Plug," a few parts per million can readily effect changes in the electrical properties of hydrocarbon products and does so without measurably affecting the dielectric constant. Regardless of the quantity used, the material avoid contamination of the product flowing in the pipe line. Further, such material has a density that closely approaches that of the fluid flowing in the pipe line so that its dispersion in the pipe line stream will be substantially the same as the dispersion of the materials of adjacent batches into each other.

These electrical conductivity enhancing materials are used as a marking means, herein for convenience sometimes called an "expendable plug." They have been successfully applied for proving pipe line meters as well as for tender flagging.

In the past, large flow meters, such as those used in pipe lines transporting liquid hydrocarbons and other liquids, have been proved by diverting or directing the flow from the pipe line through the meter into a large tank where the volume could be measured. The use of such proving tanks was complicated with the advent of large-diameter pipe lines that necessitate the use of very large capacity flow meters. The use of prover tanks for these large capacity flow meters has been impractical and thus other methods have been developed for proving flow meters. Other methods developed depend upon accurately determining, by calculation or by volumetric measurement, the fluid volume between two stations spaced a fixed distance apart in the pipe line. The methods heretofore used for marking the cylinder of liquid between the two stations, including the disadvantages involved, have previously been discussed.

Materials injected into a pipe line stream tend to disperse through the stream from the point of injection according to well known flow principles. Thus the indication from the expendable plug at a detector station downstream from the injector increases slowly from a background value to a maximum value reflecting maximum concentration of the additive at the point in the stream at which the injection was made and then decreases slowly to the background level as the expendable plug passes the detector station. It becomes a problem to determine exactly when such point of maximum concentration has passed the detector station. In general, the desired accuracy of determining such a point in the flowing stream requires that this signal be suitably interpreted and preferably automatically.

Accordingly, it is the principal object of this invention to provide a novel device for detecting an expendable pipe line plug that comprises injection of conductivity enhancing material at a first location and detecting the said material as it passes the second location.

A further object of this invention is to provide a novel device for detecting an expendable pipe line plug when used in pipe line service to prove a flow meter by injecting a conductivity enhancing material into the pipe line at a first station and detecting its passage at a second station, wherein the signal from the flow meter is provided in the form of periodic electrical impulses that are proportional to the quantity of material passing through the pipe line. The system uses a digital counting means to count the pulses, the counting means being started by the injection of the expendable plug at the first station and stopped when the expendable plug passes the second station. In one embodiment, the signal from the detector is used to trigger a circuit that passes to the digital counter every other pulse from the meter whenever the signal from the detector exceeds a preset level and then stops the digital counter when the signal again returns through the preset level to the original background level.

The above objects and advantages of this invention are achieved by providing a means for injecting a predetermined quantity of conductivity-enhancing material into the pipe line at a first station. The material forms a marker or expendable plug that identifies the point at which the material was injected. The passage of the expendable plug material is detected at a second station spaced a known distance from the first station. The detection of the passage of the expendable plug material is converted to an electrical signal whose amplitude is related to the concentration of the expendable plug material passing the second detector station at any particular time. The pipe line flow meter used in conjunction with the detecting device is provided with a means for emitting a series of electrical pulses, each pulse indicating the passage of a discreet increment of fluid through the flow meter. The flow meter is ultimately coupled to a counting device for counting the pulses that are emitted by or related to the flow through the meter. The counter is preceeded by gate circuits for starting and stopping the pulses to the counter. One of the gate circuits is controlled by the injector to allow passage of pulses to the counter while the other gate circuit is controlled by the detector to inhibit pulses to the counter. The detector is not coupled directly to the counter but coupled to the counter through a level control toggle, half counter-circuit, pulse amplifier and pulse gate. The half-counter is designed to pass to the counter every other pulse from the flow meter while the signal from the detector exceeds a predetermined threshhold level; all counts from the flow meter being passed from the instant of injection of marker material and until the threshhold level is reached. The level control toggle triggers the pulse gate and subsequently stops the counter (or blocks further transmission of pulses to it) whenever the signal from the detector falls to the preset threshhold level. The counting of every other pulse from the flow meter for the above-indicated period interpolates the signal to accurately determine the counter reading corresponding to the peak. In this way, the accuracy of the detecting apparatus is improved since the peak of the signal from the detector indicates the instant that the expendable plug actually passed the detector at the second station.

In an alternative embodiment, the amplified signal from the detector is fed simultaneously to a peak storage circuit and a peak trip circuit. When the signal amplitude in the latter circuit, this being proportional to the instantaneous signal amplitude, is less than the signal amplitude in the peak storage circuit a control signal is generated. This difference in signal amplitudes can be made suitably smaller by amplification and the resulting control signal therefore occurs, in time, at substantially the peak of the detector signal.

The above objects and advantages of this invention will be more easily understood by those skilled in the art from the following description when taken in conjunction with the attached drawing showing in block diagram form one embodiment of this invention.

Referring to the attached drawing, there is shown a pipe line 10 having a detector or measuring cell 14 disposed therein.

The measure cell 14 is preferably of the conductivity type measures the bulk conductivity of the material flowing in the pipe line. The measuring cell 14 is coupled to a circuit means that detects the conductivity of the material flowing in the pipe line and furnishes an electrical output signal level related thereto. The detecting means shown in the attached figure utilizes phase shift phenomena to provide a signal that is relatively independent of the inherent electrical noise level produced by the tribo-electric and other effects prevailing at the liquid-to-metal interface in the pipe line system.

The variation of electrical conductivity of the pipe line stream is sensed by an electrometer circuit 25 one of whose elements is the detector cell 14. An alternating current from oscillator 20 is applied to the electrometer circuit resulting in a voltage to the emitter follower 26 that varies in phase and amplitude relative to that supplied to the electrometer circuit in a manner determined by the variation of electrical conductivity of the pipe line stream. Use of alternating current in the transducer serves to minimize electrical polarization effects which may occur. The oscillator 20 has a relatively low frequency, for example 40 cycles per second. In addition to being coupled to the detector cell the oscillator 20 is coupled to a phase-shifting network 21 that is provided with an adjusting means 22 for adjusting the zero position of the measuring circuit. The phase-shifting network 21 is coupled to a phase comparator 23 through an emitter-follower transistor circuit 24. While an emitter follower is shown, obviously other circuits that are used for matching impedance between two separate circuit elements 21 and 24 could also be used, for example vacuum tube cathode followers, transformers and the like. The signal from the oscillator 20 (as modified by the detector cell 14) is supplied to the phase comparator 23 through a circuit means that includes the electrometer 25, an emitter-follower transistor circuit 26, a squaring amplifier 27 and trigger circuit 28. The electrometer 25 is used as a high input impedance amplifier and thus any amplifier with these characteristics could also be used. It is necessary to use a high input impedance amplifier since the resistance of the detector cell 14 with normal petroleum fluids flowing in is usually several thousand megohms, and this drops to a resistance as low as one megohm when the expendable plug passes. These resistances make it necessary to use a high input impedance amplifier. The emitter-follower merely matches the impedance of the electrometer 25 to the squaring amplifier 27 that provides a square-shaped signal in place of the sinusoidal signal received from the oscillator 20 and detector cell 14. The trigger circuit 28 is utilized as a second stage of squaring to provide a signal having a very steep rise that may be easily compared in the phase comparator 23 with the signal from the oscillator 20.

The signal from the phase comparator 23 is supplied to a differential amplifier 30 whose output is displayed on the meter 31. The differential amplifier 30 is used to accentuate the variations in the signal from the phase comparator 23 in order that one may observe the passage of the expendable plug on the meter 31.

It is at this point that the expendable plug is used to perform various control functions. Should it be desired to seek the peak of the plug signature, as may be desired for identifying this point in the liquid stream with or without reference to meter readings, the interpreted signal from the phase comparator 23 is supplied to an emitter follower 40. Hence, the signal from the emitter follower 40 is supplied to the peak storage circuit 41, through emitter follower circuit 42 to the differential amplifier 44. Also the same signal from the emitter follower 40 is supplied to the peak trip adjust circuit 43, the emitter follower 48 and, subsequently, the differential amplifier 44. The selector device 49 must be in the upper position to allow passage of the signal to the peak trip adjust circuit. Thus, the differential amplifier 44 will supply an output signal indicating the difference between the peak value of signal from the phase comparator 23 and its instantaneous value. The output signal from the differential amplifier 44 is supplied to the emitter follower 61, the output of which drives an alarm relay 45. At the point where the signal first begins to depart from the peak value of the plug, the alarm relay 45 is energized and an output in the form of a contact closure is provided for control purposes. The passage of the peak may be related to plug injection, flow meter readings, time, or other line operating parameters.

Another system for detecting the expendable plug that is especially suited for proving liquid pipe line meters incorporates elements 50, 51, 52, 53, 54, 55, 60, 12 and 15 as shown on the attached drawing. This system is referred to herein as the interpolation system. The flow meter in the pipeline 10 may be of the velocity or positive displaceemnt type in which the flow of the fluid past the meter rotates an element of the meter, said rotation generating a series of electrical pulses supplied to the pulse amplifier 15, trigger circuit 12, half counter 52, pulse amplifier 53 and pulse gate 54. Each pulse is proportional to a specific quantity of fluid that flows past the measuring means 11. Disposed on the right hand portion of the pipeline 10, which is upstream of the detector cell 14, is an injector means 13 designed to inject a predetermined quantity of the expendable plug material into the pipeline 10. The injector as it injects the expendable plug material generates a signal at the midpoint of injection indicating the point or peak of greatest concentration of the plug material.

From the above description it can be seen that the injector 13 will inject an expendable plug into the line 10 and at one-half of the full injected quantity send a start pulse to the gate toggle 51. The gate toggle 51 in turn will signal pulse gate 54 to allow passage of meter pulses from the meter 11, through amplifier 15, trigger 12, half counter 52, pulse amplifier 53, pulse gate 54, delay multivibrator 55, to the counter 60. The decade counter 60 will continue to count every meter pulse until a signal is produced by the level control toggle 50. This signal which is supplied to gate toggle 51, allowing pulse gate 54 to pass pulses to the decade counter 60 through delay multivibrator 55, is generated at the exact midpoint of the injection cycle, and therefor uniquely identifies the physical center of the plug. For best resolution of signal at a detector station, the rate of injection should be extremely fast.

When the expendable plug is used to prove a liquid flow meter, the selector device 49 should be placed in the lower position. This allows passage of the expendable plug signal from the phase comparator 23 and emitter follower 40 to be supplied directly to the differential amplifier 44, through emitter follower 48. The graphic recorder 46 is included only as an accessory item for visually displaying, in permanent record form, the passage of the expendable plug past the detector cell 14. The level set control 56 is connected to the differential amplifier 44 to provide a means of selecting a specific level on the amplitude of the plug indication at which it is desired to obtain an output signal from the differential amplifier 44 to the emitter follower 47. This output signal from the emitter follower 47 is supplied to the level control toggle 50. The level control toggle 50 is a binary circuit which produces two individual output signals as the expendable plug passes the detector cell 14. Should the said level be increasingly positively from a known background level to a maximum value, the level control toggle 50 will supply an output signal to the half counter 52 when the amplitude of the plug passes the value preselected on the level set control 56. This amplitude is chosen to be at the point of greatest symmetry, which is approximately two-thirds or more of the peak value of the signal from the phase comparator. This signal acts to inhibit every other pulse from the meter 11.

As the amplitude of the plug signature decreases negatively from a peak or maximum value to the same previously mentioned level set point, another output signal from the level control toggle 50 is supplied to the gate toggle 51 which in turn signals the pulse gate 54 to inhibit all pulses to the decade counter 60 through delay multivibrator 55.

Thus, the total count displayed on the decade counter 60 will be substantially equal to the number of pulses from the meter 11 that occur between one-half the time that the plug was fully injected by the injector 13 and when the peak concentration passed the detector cell 14. Operating results show that the plug when it passes detector cell 14 will cause an output signal in the phase comparator 23 that rises from background level to a peak value and then falls to the background level again with the peak value indicating the passage of the expendable plug. In addition, it has been found that the signal from the phase comparator produced as a result of the plug passing the detector 14 will be approximately symmetrical around the peak value. Thus, the count on the counter 60 will be an accurate measure of the pulses produced by the meter during the time interval required for the plug to pass from the injector 13 to the detector 14. The volume of the pipeline between the two points can be determined and used to establish the volume of liquid represented by each pulse.

While various types of materials may be injected, it is preferable to inject a material which will change the electrical conductivity of the fluid flowing in the pipe line. One suitable material is an antistatic material that is used to increase the conductivity of hydrocarbons, as for example a chromium salt of an alkylated salicyclic and wherein the alkyl group contains from 14 to 18 carbon atoms. This material is very desirable since a small quantity is sufficient to form a marker in a pipe line. Further, this material has no undesirable effects on normal hydrocarbons nor does it contaminate hydrocarbons to the point of degrading product specifications.

We claim as our invention:

1. An apparatus for determining at a point in a pipe line the midpoint of a marker material that is injected into a fluid flowing in a pipe line and subsequently disperses in said fluid, said apparatus comprising:

a detector positioned on said pipe line at said point to detect the passage of said marker material, said detector supplying an electrical signal related to the quantity of said marker material present in said fluid;

an amplifying means, said amplifying means being coupled to said detector to amplify said electrical signal;

a peak storage circuit, said peak storage circuit being coupled to said amplifier; and a difference amplifier, said difference amplifier being coupled to both said amplifying means and said peak storage device to compare the instantaneous value of said electrical signal with the peak value and supply an output signal when said instantaneous value is less than said peak value.

2. An apparatus for proving a flow meter disposed in a pipe line, said flow meter supplying a series of electrical pulses proportional to the flow therethrough, said apparatus comprising:

an injector assembly disposed to inject into the pipe line a quantity of an expendable plug material having the capability of significantly changing electrical characteristics of the fluid in the pipe line and said injector assembly including means to supply an electrical signal indicating one-half the travel of full injection of said material;

a detecting means disposed in said pipe line a predetermined distance from said injector assembly, said detecting means in addition including means to supply a second electrical signal when said material passes the detector;

a counter means and a pulse gate coupled to the counter means to pass or inhibit pulses to the counter;

a half counter means for passing every other electrical pulse, said half counter means being coupled to said flow meter and said pulse gate being coupled to said half counter means;

a level control circuit, said detector means being coupled to said level control circuit to permit said level control circuit to actuate said half counter means to cause said half counter means to inhibit every other pulse from said meter, when said electrical signal raises above a present level, said level control circuit in addition being coupled to a gate circuit to signal said pulse gate to inhibit pulses to the said counter means when said second electrical signal again falls to said preset level.

3. An apparatus for proving a flow meter disposed in a pipe line wherein the flow meter supplies a series of electrical pulses proportional to the fluid flow through the meter, said apparatus comprising:

an injector assembly disposed to inject into a pipe line a quantity of a material having electrical characteristics different than the material in the pipe line;

a detector disposed a predetermined distance downstream from the injector assembly, said detector including means for detecting the passage of said material and supplying a related electrical signal;

a counter means for counting electrical pulses, said counter means having a pulse gate circuit;

said injector being coupled to a gate circuit to open said pulse gate circuit during the injection of the material;

a half pulse control circuit, said pulse gate circuit and said detector being coupled to said half pulse control circuit, said half pulse circuit being disposed to supply every other of said electrical pulses to said counter means when said related electrical signal exceeds a predetermined value and block said electrical pulses when said realated electrical signal is less than said predetermined value.

4. The apparatus of claim 1 wherein the material has an electrical conductivity different from the electrical conductivity of the fluid flowing in the pipe line and said detector detects the conductivity of the fluid.

5. The apparatus of claim 4 wherein a source of fluid frequency oscillations is coupled to said detector; a phase detecting means; said phase detecting means being coupled to said peak storage circuit and said difference amplifier.

6. The apparatus of claim 2 wherein a source of fixed frequency oscillations is coupled to said detecting means; a phase detecting circuit, said source and said detector being coupled to said phase detecting means, said phase detecting means being coupled to said trigger circuit.

References Cited by the Examiner

UNITED STATES PATENTS 3,028,744   4/1962   Bagwell et al. _____ 73—3
3,089,030   5/1963   Sherbatskoy _____ 250—106

LOUIS R. PRINCE, *Primary Examiner.*

S. C. SWISHER, *Assistant Examiner.*